UNITED STATES PATENT OFFICE.

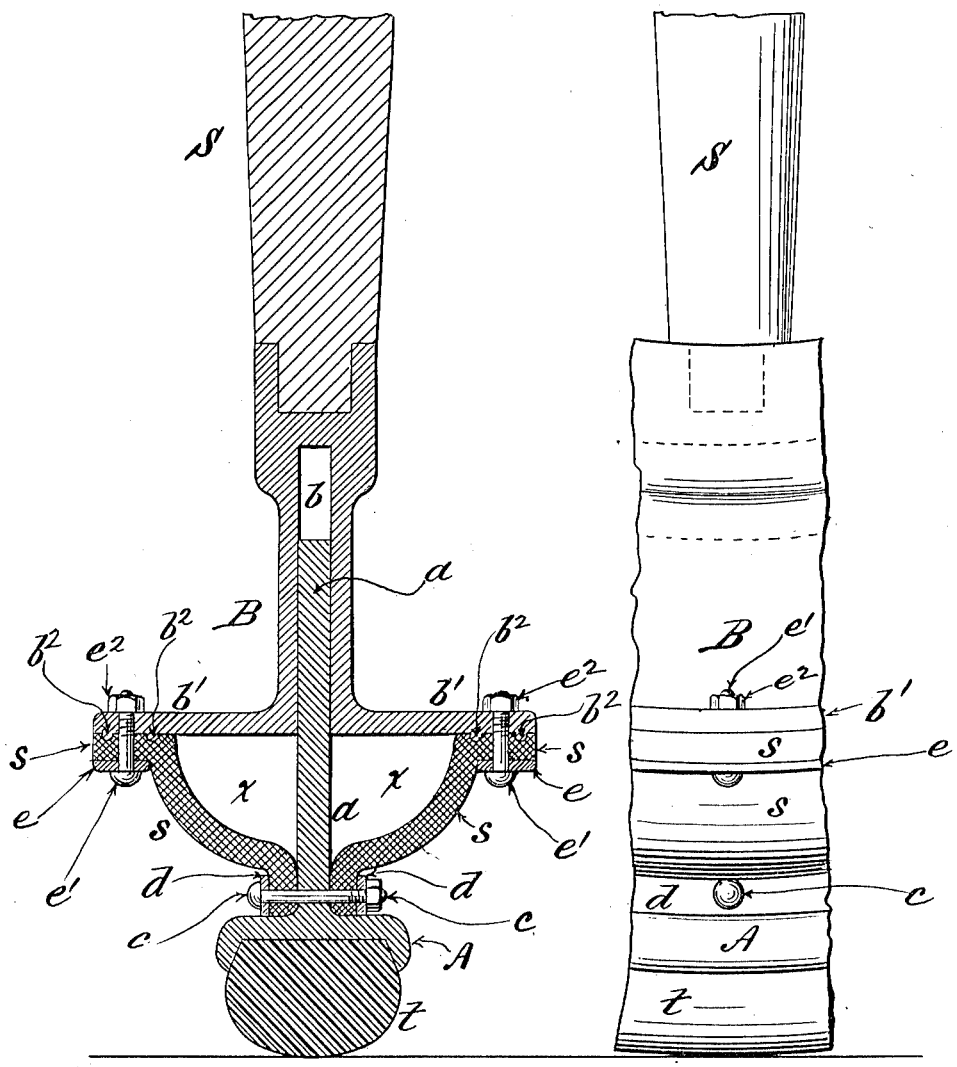

ALPHONSE A. PICARD, OF NEW YORK, N. Y.

WHEEL-TIRE.

1,071,953.  Specification of Letters Patent.  Patented Sept. 2, 1913.

Application filed August 12, 1912. Serial No. 714,498.

*To all whom it may concern:*

Be it known that I, ALPHONSE ARTHUR PICARD, a subject of Great Britain, and a resident of the borough of Manhattan, city, county, and State of New York, have invented certain new and useful Improvements in Wheel-Tires, of which the following is a specification.

My invention is designed primarily to afford a simple but effective substitute for the inflated tire, overcoming the difficulties and inconveniences involved in the use of the latter, and attaining other practical advantages such as strength, combined with resilience and durability, comparative cheapness &c.

The invention consists in the specific construction and arrangement of parts herein described and claimed, a distinguishing feature being the provision of an auxiliary "floating" rim engaging with and slidable upon a rigid central base rim, between which and the floating rim are interposed elastic resilient side struts or braces which separate the said parts while allowing the auxiliary or floating rim to conform to pressure in use,—said auxiliary rim carrying a solid tread of elastic resilient material, all as hereinafter more fully set forth.

In the accompanying drawings, Figure 1, is a transverse section of my improved tire; and Fig. 2, a side elevation of a portion thereof.

In the drawings B, represents the central base rim attached to the spokes S, of the wheel or otherwise rigidly connected with the hub thereof, as may be found most expedient. This base rim is formed with an annular groove or recess $b$, and with lateral annular flanges $b'$, $b'$.

A, is an auxiliary "floating" annular rim, upon the peripheral side of which is mounted a solid tread $t$, of elastic resilient material, the external surface of which is preferably curved convexly as related to its cross section, so as to afford a limited contact with the ground. The rear of the auxiliary rim A, is formed with a central annular flange $a$, the inner portion of which fits in the annular groove $b$, in the base rim B, so as to be supported laterally by the sides thereof,— the groove $b$, being of sufficient depth to admit of the requisite degree of play between the parts.

Annular truss struts $s, s$, are interposed between the flanges $b'$, $b'$, and the auxiliary rim A,—the edges of said struts $s, s$, being secured in place by the use of suitable mechanical expedients. Thus in the drawings the outer edges of the truss struts $s, s$, are secured to the annular flange $a$, by means of screw bolts $c$,—annular washer plates $d, d$, being interposed between these edges of the struts $s, s$, and the bolt heads and nuts as shown in Fig. 1. In similar manner the inner edges of the truss struts $s, s$, may be secured to the outer edges of the base rim flanges $b'$, $b'$, by means of ring plates $e, e$, and screw bolts $e', e'$, and nuts $e^2, e^2$; and the flanges $b'$, $b'$, may be formed with annular beads or shoulders $b^2, b^2$, to engage with corresponding grooves in the opposed surfaces of the struts $s, s$, (also shown in Fig. 1) for the purpose of preventing the lateral creeping of the said struts.

The truss struts $s, s$, are made of any suitable combination of fabric and rubber, or of any material of composition affording the requisite strength and inherent elasticity and resilience, which must be sufficient to sustain the load imposed upon the wheel while allowing the auxiliary rim A, an appropriate degree of motion as related to the base rim B. In other words the auxiliary rim A, is cushioned upon and by the truss struts $s, s$, while held and supported laterally by the base rim B. The truss struts $s, s$, are preferably (though not necessarily) continuous endless annular side members of the tire, being approximately quadrental in cross section; and when thus formed create annular air spaces or chambers $x, x$, in which the air is confined. But the tire is not inflated with compressed air, the spaces $x, x$, containing only air at atmospheric pressure, and whatever compression of air occurs in the use of the wheel is distributed over the entire circumference thereof so as to be slight and negligable. It is preferable to make the truss struts in the form of continuous, endless annular side members in order to exclude moisture, dust and extraneous matter generally, the confinement of air in the spaces $x, x$, however is not an essential or material feature. Hence, obviously the accidental puncture of one or both the side struts $s, s$, would not seriously impair the efficiency of the tire. As a matter of fact however there is little danger of puncturing or injuring the side truss struts $s, s$, during ordinary conditions of use, since they are protected by both the auxiliary rim A, and the lateral flanges b', b', of the base rim B; and for this reason it is not necessary to use "No. 1." or other expensive rubber in their composition. Hence I am not only able to produce a comparatively simple, cheap tire having the desirable attributes of strength, resilience and compactness of structure, but I also produce a tire in which the parts will remain integral until worn out, being proof against the ordinary dangers and accidents of road travel, so that, whereas the life of an ordinary pneumatic tire is rated as of three months or 3500 miles of traffic, by my improved structure the life of the tire may be extended to 10,000 miles without danger or discomfort to the users. This is largely owing to the use of a solid tread, and the fact that the latter is saved from excessive wear, and the effects of impact, by reason of the flexibility and play allowed the auxiliary rim A, as well as from the isolation and protection of the side truss struts s, s.

By my invention the necessity for carrying extra tires or tubing is dispensed with, thereby effecting economy in space and weight; and a "blow out" is impossible.

What I claim as my invention and desire to secure by Letters Patent is,

In a tire of the character stated, a base rim with lateral flanges and an annular groove, an auxiliary floating annular rim having a central flange slidable in said groove, truss struts of elastic material interposed between the said rims and having flanges disposed at right angles to each other, means passed through flanges of the struts for securing said struts to the said flange of the floating rim, and means passed through flanges of the struts for securing the struts to the flanges of the base rim, with means to prevent lateral creeping of the struts.

ALPHONSE A. PICARD.

Witnesses:
   LILLIA MIATT,
   GEO. WM. MIATT.

---

Copies of this patent may be obtained for five cents each, by addressing the "Commissioner of Patents, Washington, D. C."